(12) United States Patent
Bao et al.

(10) Patent No.: US 8,519,671 B2
(45) Date of Patent: Aug. 27, 2013

(54) POWER SUPPLY CIRCUIT AND METHOD FOR PROVIDING OUTPUT VOLTAGE TO CHARGE A BATTERY

(75) Inventors: Cheng Bao, Waterloo (CA); Martin Guthrie, Moffat (CA); Frank Bognar, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 624 days.

(21) Appl. No.: 12/210,710

(22) Filed: Sep. 15, 2008

(65) Prior Publication Data

US 2010/0066311 A1    Mar. 18, 2010

(51) Int. Cl.
*H02J 7/00*   (2006.01)

(52) U.S. Cl.
USPC ............ 320/128; 320/140; 320/160; 320/132

(58) Field of Classification Search
USPC ....................................................... 320/128
See application file for complete search history.

(56) References Cited

U.S. PATENT DOCUMENTS

| | | | |
|---|---|---|---|
| 4,399,396 | A | 8/1983 | Hase |
| 5,717,309 | A | 2/1998 | Cho |
| 5,773,963 | A | 6/1998 | Blanc et al. |
| 5,844,398 | A | 12/1998 | Kwan et al. |
| 5,903,764 | A | 5/1999 | Shyr et al. |
| 6,002,237 | A | 12/1999 | Gaza |
| 6,005,368 | A | 12/1999 | Frame |
| 6,081,096 | A | 6/2000 | Barkat et al. |
| 6,081,104 | A * | 6/2000 | Kern ............................. 323/268 |
| 6,204,632 | B1 | 3/2001 | Nierescher |
| 6,424,119 | B1 | 7/2002 | Nelson et al. |
| 6,445,159 | B1 | 9/2002 | Ramsden |
| 6,534,953 | B2 | 3/2003 | Shirakawa |
| 6,650,089 | B1 | 11/2003 | Freeman et al. |
| 6,853,165 | B2 | 2/2005 | Chen |
| 7,116,079 | B2 | 10/2006 | Bayne et al. |
| 7,560,898 | B1 * | 7/2009 | Kranzen et al. ................ 320/107 |
| 2004/0095095 | A1 * | 5/2004 | Yamamoto et al. ............ 320/128 |
| 2008/0129252 | A1 * | 6/2008 | Nishino ......................... 320/162 |
| 2010/0264875 | A1 * | 10/2010 | Hoffman et al. ............... 320/111 |

FOREIGN PATENT DOCUMENTS

| | | |
|---|---|---|
| CA | 2678271 A1 | 3/2010 |
| DE | 4200693 | 5/1993 |
| EP | 0621990 | 12/1996 |
| EP | 1124300 | 8/2001 |
| EP | 2164150 A1 | 3/2010 |

OTHER PUBLICATIONS

European Extended Search Report, European Patent Application No. 08164341.3, dated Jun. 4, 2009.
European Examination Report, European Patent Application No. 08164341.3, dated May 20, 2010.
Partial European Search Report dated Mar. 9, 2009, European Patent Application No. 08164341.3.
Dearborn, "Charging Lithium-Ion Batteries: Not All Charging Systems Are Created Equal", Analog and Interface Guide—vol. 2, Microchip Technology Inc., Sep. 1, 2005.
Search Report Response, EP Application No. 08164341.3, dated Aug. 18, 2009.
Search Report Response, EP Application No. 08164341.3, dated Aug. 24, 2009.
Exam Report Response, EP Application No. 08164341.3, dated Nov. 25, 2010.
Maxim Application Note 913 Switch-Mode, Linear, and Pulse Charging Techniques for Li+ Battery in Mobile Phones and PDAs, Maxim Integrated Products, Dec. 27, 2001.
Maxim Max 1898 Linear Charger for Single-Cell Li+ Battery, Maxim Integrated Products, Sunnyvale, CA, USA, 2002.
Microchip MCP73841/2/3/4 Advanced Single or Dual Cell Lithium-Ion/Lithium-Polymer Charge Management Controllers, Microchip Technology Inc., 2004.
Microchip MCP73861/2/3/4 Advanced Single or Dual Cell, Fully Integrated Li-Ion / Li-Polymer Charge Management Controllers, Microchip Technology Inc., 2004.
Analog Devices, Compact, 1.5 A Linear Charger for Single-Cell Li+ Battery ADP2291, Norwood, MA, U.S.A., 2005.
Canadian Office Action dated Oct. 3, 2012, Canadian Patent Application No. 2,678,271.
Communication under Rule 71(3) EPC dated Oct. 16, 2012, European Patent Application No. 08164341.3.
Canadian Office Action Response dated Apr. 2, 2013, Canadian Patent Application No. 2,678,271.
Decision to Grant, dated Mar. 7, 2013, European Patent Application No. 08164341.3.

* cited by examiner

*Primary Examiner* — Arun Williams
(74) *Attorney, Agent, or Firm* — Bereskin & Parr LLP/S.E.N.C.R.L., s.r.l.

(57) ABSTRACT

Various embodiments are described herein for a charging device and an associated charging method for charging a rechargeable battery. The charging device generally includes a current source that is coupled to a power source and configured to provide a charging current to the rechargeable battery. The charging device further includes a controller that is configured to control the current source to provide the charging current with an amplitude that is less than the charging current required by the rechargeable battery in a given charging state to bring an output voltage of the current source towards the voltage of the rechargeable battery.

38 Claims, 8 Drawing Sheets

POWER SUPPLY CIRCUIT AND METHOD FOR PROVIDING OUTPUT VOLTAGE TO CHARGE A BATTERY

FIELD

The various embodiments described herein generally relate to a power supply circuit and an associated charging method that can be employed to charge a rechargeable battery of a portable device.

BACKGROUND

Many portable or mobile devices use rechargeable batteries that are charged using a charging device. The charging device can be a power adaptor that connects to a power outlet or it can be a mobile charging device that is also battery powered. The design of the charging device has an effect on whether it operates in an energy efficient manner and whether it can overheat during the charging process.

BRIEF DESCRIPTION OF THE DRAWINGS

For a better understanding of the following embodiments described herein, and to show more clearly how the various embodiments described herein may be carried into effect, reference will be made, by way of example, to the accompanying drawings which show at least one example embodiment, and in which.

DETAILED DESCRIPTION OF THE EMBODIMENTS

Figure 1:
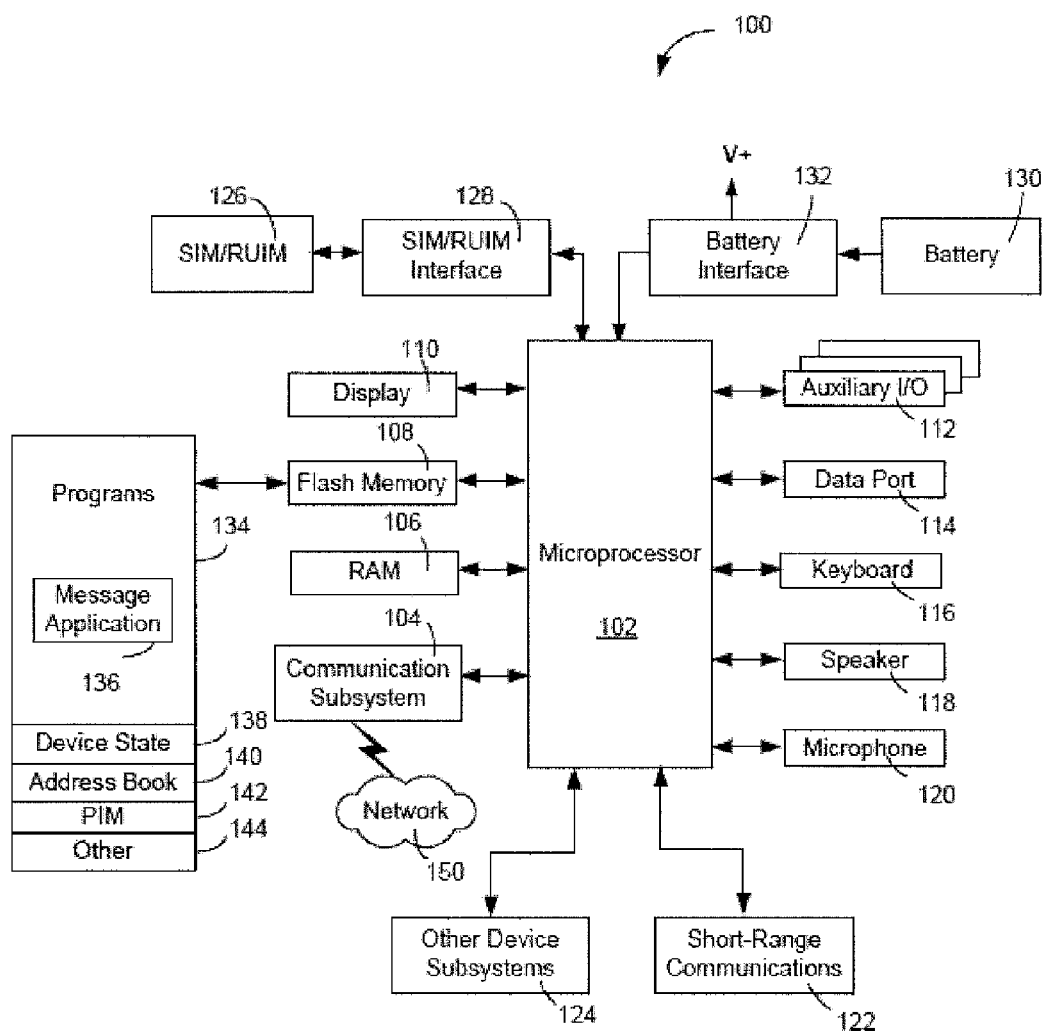
FIG. 1 is a block diagram of a mobile device in one example implementation.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein. The detailed description begins with a general description of a mobile device and then proceeds to describe the application of example embodiments of a charging device that can charge one or more rechargeable batteries of the mobile device.

To aid the reader in understanding the structure of the mobile device, reference will be made to FIG. 1. However, it should be understood that the embodiment of the mobile device is not limited to that which is described herein. Examples of different mobile devices generally include any portable electronic device that requires charging of its batteries such as cellular phones, cellular smart-phones, pagers, wireless organizers, personal digital assistants computers, laptops, handheld wireless communication devices, wirelessly enabled notebook computers, a wireless Internet appliance and the like.

Referring to FIG. 1, shown therein is a block diagram of a mobile device 100 in one example implementation. The mobile device 100 comprises a number of components, the controlling component being a microprocessor 102, which controls the overall operation of mobile device 100. Communication functions, including data and voice communications, are performed through a communication subsystem 104. The communication subsystem 104 receives messages from and sends messages to a wireless network 150. In this example implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the embodiment described herein is intended to use any other suitable standards that are developed in the future. The wireless link connecting the communication subsystem 104 with the wireless network 150 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 150 associated with the mobile device 100 is a GSM/GPRS wireless network in one example implementation, other wireless networks can also be associated with the mobile device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The microprocessor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications subsystem 122 and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the wireless network 150, and device-resident functions such as a calculator or task list. Operating system software used by the microprocessor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 150 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 150. By inserting the SIM card/RUIM 126 into the SIM/RUIM interface 128, a subscriber can access all subscribed services. Services can include: web browsing and messaging such as e-mail, voice mail, SMS, and MMS. More advanced services can include: point of sale, field service and sales force automation. The SIM card/RUIM 126 includes a processor and memory for storing information. Once the SIM card/RUIM 126 is inserted into the SIM/RUIM interface 128, it is coupled to the microprocessor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 can store additional subscriber information for a mobile device as well, including datebook (or calendar) information and recent call information. Alternatively, user identification information can also be programmed into the flash memory 108.

The mobile device 100 is a battery-powered device and includes a battery interface 132 and uses one or more rechargeable batteries 130 The battery interface 132 is coupled to a regulator (not shown), which assists the battery 130 in providing power V+ to the mobile device 100. As will be discussed below, rechargeable batteries 130 may be charged using a charging device (not shown), and it is generally desirable for the charging device to operate in an energy efficient manner without overheating.

The microprocessor 102, in addition to its operating system functions, enables execution of software applications 134 on the mobile device 100. The subset of software applications 134 that control basic device operations, including data and voice communication applications, will normally be installed on the mobile device 100 during its manufacture.

The software applications 134 include a message application 136 that can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages can be stored remotely from the mobile device 100 such as in a data store of an associated host system that the mobile device 100 communicates with. For instance, in some cases, only recent messages can be stored within the mobile device 100 while the older messages can be stored in a remote location such as the data store associated with a message server. This can occur when the internal memory of the mobile device 100 is full or when messages have reached a certain "age", i.e. messages older than three months can be stored at a remote location. In an alternative implementation, all messages can be stored in a remote location while only recent messages can be stored on the mobile device 100.

The mobile device 100 further includes a device state module 138, an address book 140, a Personal Information Manager (PIM) 142, and other modules 144. The device state module 138 provides persistence, i.e. the device state module 138 ensures that important device data is stored in persistent memory, such as the flash memory 108, so that the data is not lost when the mobile device 100 is turned off or loses power. The address book 140 provides information for a list of contacts for the user. For a given contact in the address book, the information can include the name, phone number, work address and email address of the contact, among other information. The other modules 144 can include a configuration module (not shown) as well as other modules that can be used in conjunction with the SIM/RUIM interface 128.

The PIM 142 has functionality for organizing and managing data items of interest to a subscriber, such as, but not limited to, e-mail, calendar events, voice mails, appointments, and task items. A PIM application has the ability to send and receive data items via the wireless network 150. PIM data items can be seamlessly integrated, synchronized, and updated via the wireless network 150 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 150, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path can, for example be used to load an encryption key onto the mobile device 100 through a direct and thus reliable and trusted connection to provide secure device communication. The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a USB charging current to charge the mobile device 100.

The short-range communications subsystem 122 provides for communication between the mobile device 100 and different systems or devices, without the use of the wireless network 150. For example, the subsystem 122 can include an infrared device and associated circuits and components for short-range communication. Examples of short-range communication include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the microprocessor 102. The microprocessor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary I/O subsystem 112 can include devices such as a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 150 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
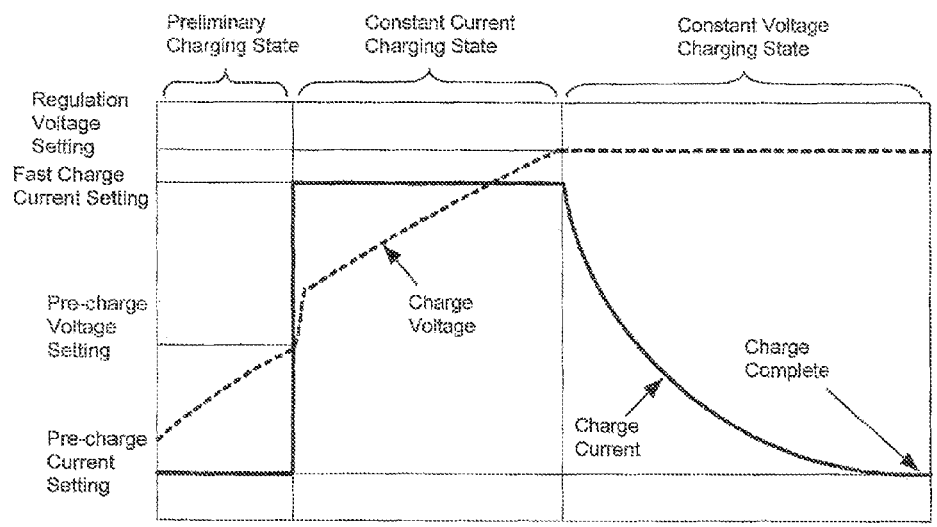
FIG. 2 is an illustration showing the relationship between charging current versus battery voltage as a function of time for charging a rechargeable battery of the mobile device.

Referring now to FIG. 2, shown therein is an illustration of the relationship between charging current and battery voltage, each plotted as a function of time, when charging a rechargeable battery of the mobile device 100. There are three charging states when the battery 130 is being recharged: a preliminary charging state, a constant current charging state and a constant voltage charging state. In the preliminary charging state, the battery 130 is charged with a charging current with an amplitude at a pre-charge current setting that is usually 10% to 20% of the amplitude associated with a fast charge current setting. The charging state is in the preliminary charging state when the battery is deeply discharged and the voltage of the battery is below the pre-charge voltage setting specified by the battery charger datasheet. The voltage of the battery is the voltage across the battery 130. In a typical implementation, the pre-charge voltage setting is normally 2.3 V to 3.1 V and is depicted in FIG. 2. When the voltage of the battery 13D is low, it generally cannot be charged with a charging current that has a high amplitude since the battery 130 may get damaged. In this charging state, the charging current has an amplitude that is generally constant. As shown by FIG. 2, even though the charging current (represented by the solid line) remains generally constant, the charge voltage (represented by the dashed line) rises as charging progresses.

When the voltage of the battery 130 is above the pre-charge voltage setting and below a regulation voltage setting, the charging state changes from the preliminary charging state to the constant current charging state, in which the charging current has a higher amplitude to charge the battery 130 more quickly. In this charging state, the charging current also has a generally constant amplitude. As shown by FIG. 2, the charging current (represented by the solid line) remains generally constant, although at a higher level than in the preliminary charging state, and the charge voltage continues to rise.

When the voltage of the battery 130 reaches the regulation voltage setting, the voltage of the battery 130 is maintained at a generally constant amplitude, but the amplitude of the charging current goes down gradually. The regulation voltage selling can be, for example, 4.2 V or so. For conventional chargers, once the amplitude of the charging current goes down below the charge termination current set by the battery charger parameters of the mobile device 100, conventional charging devices remove the charging current and the battery 130 is considered to be fully charged at this time. The charge termination current can be anywhere below 20% of the capacity of the battery 130 and the charge termination current is set by the battery charger. Setting the charge termination current at 10% of the fast charging current level is a typical value, but it may vary for different battery charging requirements. Different battery manufacturers may have different requirements on the pre-charge current setting.

Various embodiments are now described for a charging device, i.e. a power supply circuit, and an associated charging method that can be employed to charge the battery 130 in a more efficient manner in several ways. For example, the charging device can be configured to reduce the voltage drop across the battery interface 132 to reduce the power loss as well as the generated heat when charging the battery 130. In addition, or in an alternative, the charging device can be configured to detect the charge level of the battery 130 without directly measuring its voltage and charging the battery 130 under certain conditions. For example, the charging device can be configured to stop charging the battery 130 and go to sleep mode when the battery 130 is close to full charge capacity, which occurs when the charging state for recharging the battery 130 switches to the constant voltage charging state. In the example embodiments shown herein, the charging device performs both of these operations, however, there can be other embodiments in which the charging device only performs one of these operations (i.e. reducing voltage drop or turning off charging once the constant voltage charging state is detected). The term "reducing voltage drop" (and variants thereof) should be understood to mean reducing the output voltage of the current source to bring it closer to the voltage of the battery thereby reducing power dissipation across the battery interface.

The charging device can be a stand-alone charging device that is connectable to a power source such as a power outlet, or to a firewire connection that is provided by a computer. Alternatively, the charging device can be a charging holster (not shown) that has a built-in battery. In this case, when a user puts the mobile device 100 in the charging holster, the battery in the charging holster will charge the battery 130 of the mobile device 100.

Figure 3:
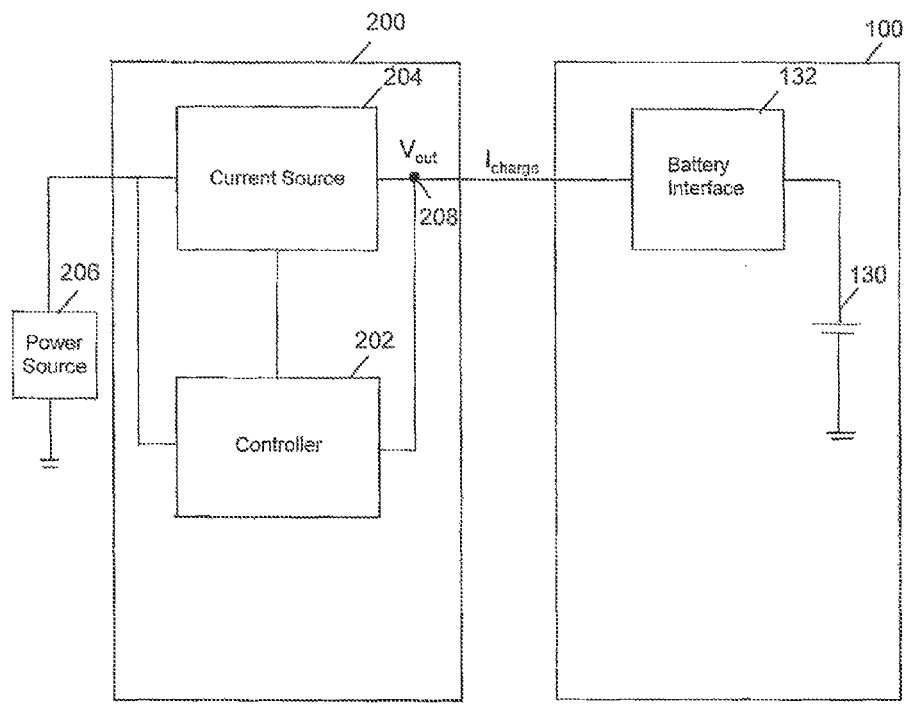
FIG. 3 is a schematic block diagram of an example embodiment of a charging device for charging a rechargeable battery of a mobile device.

Referring now to FIG. 3, shown therein is a schematic block diagram of an example embodiment of a charging device 200 for charging the mobile device 100. The charging device 200 includes a controller 202 and a current source 204. The controller 202 is a microprocessor, but in alternative embodiments can be any computing device that can provide similar functionality. The current source 204 provides a charging current $I_{charge}$ via an output node 208 to the battery interface 132 of the mobile device 100 to charge the battery 130. The current source 204 and the controller 202 receive power from a power source 206. The power source 206 can be an external power source, such as a power outlet for example, or an internal power source, such as a battery. These elements can be directly coupled with one another as shown in FIG. 3 or they can be coupled to one another using intermediate elements such as an electrical element, for example, which includes but is not limited to a resistor.

The voltage connections between the charging device 200 and the mobile device 100 are only between the output node 208 and ground. There is no need to use a communication protocol for the charging device 200 and the mobile device 100 in order for the charging device 200 to charge the battery 130 in an efficient manner. Rather, the controller 202 determines the charging state of the battery 130 and sets the current source 204 to operate in an appropriate manner for efficient charging. For instance, when the controller 202 determines that the charging state is the constant voltage charging state, the controller 202 sets the current source 204 to operate in sleep mode in which case the charging current $I_{charge}$ is removed and the charging device 200 stops charging the battery 130. This results in a more efficient charging process, since the battery 130 can be in the constant voltage charging state for quite a long time, such as one-half hour to one hour, before the charging process is complete and there is not much benefit in terms of the additional charging that is done. For instance, in the constant voltage charging state, the battery 130 has sufficient energy to allow the users to use the mobile device 100 for data transmission or for making a phone call, for a reasonable amount of time. Accordingly, it is more efficient to not charge the battery 130 during the constant voltage charging state.

There are several embodiments that can be used in order for the charging device 200 to reduce the voltage drop as well as to determine the charging state of the battery 130 to disable charging in the constant voltage charging state. However, it should be noted that these embodiments can also be modified, for example, by not quickly disabling the current source 204 once the constant voltage charging state is entered. It should also be noted that the various embodiments of the charging device 200 described herein can be used with many different types of battery interfaces. Various embodiments can be used to disable the current source 204 under certain conditions. For example, the controller 202 can be configured to vary the amplitude of the charging current $I_{charge}$ provided by the current source 204 and measure the output voltage $V_{out}$ at the output node 208 to determine whether the charging state of the battery 130 is the constant voltage charging state. This embodiment is described in more detail with respect to FIGS. 4, 5, 8 and 9. Alternatively, the charging device 200 can be configured to vary the amplitude of the output voltage $V_{out}$ at the output node 208 of the current source and measure the amplitude of the charging current $I_{charge}$ to determine whether the charging state of the battery 130 is the constant voltage charging state. This embodiment is described in more detail with respect to FIGS. 6 and 7. Accordingly, if the controller 202 is a microprocessor, the General Purposes Input Output (GPIO) pin of the microprocessor can be used to configure operation of the current source 204 and the amplitude of the charging current $I_{charge}$ or the amplitude of the output voltage $V_{out}$. The Analog to Digital Converter (ADC) input pin of the microprocessor can be configured to measure the amplitude of the output voltage $V_{out}$ or the amplitude of the charging current $I_{charge}$, respectively. In these embodiments, the controller 202 is configured to control the current source 204 to provide the charging current $I_{charge}$ with an amplitude that is less than the charging current required by the battery 130 in a given charging state to bring the output voltage $V_{out}$ of the current source 204 towards the voltage of the battery 130 and hence reduce voltage drop and power loss during charging. These embodiments will now be discussed.

Figure 4:
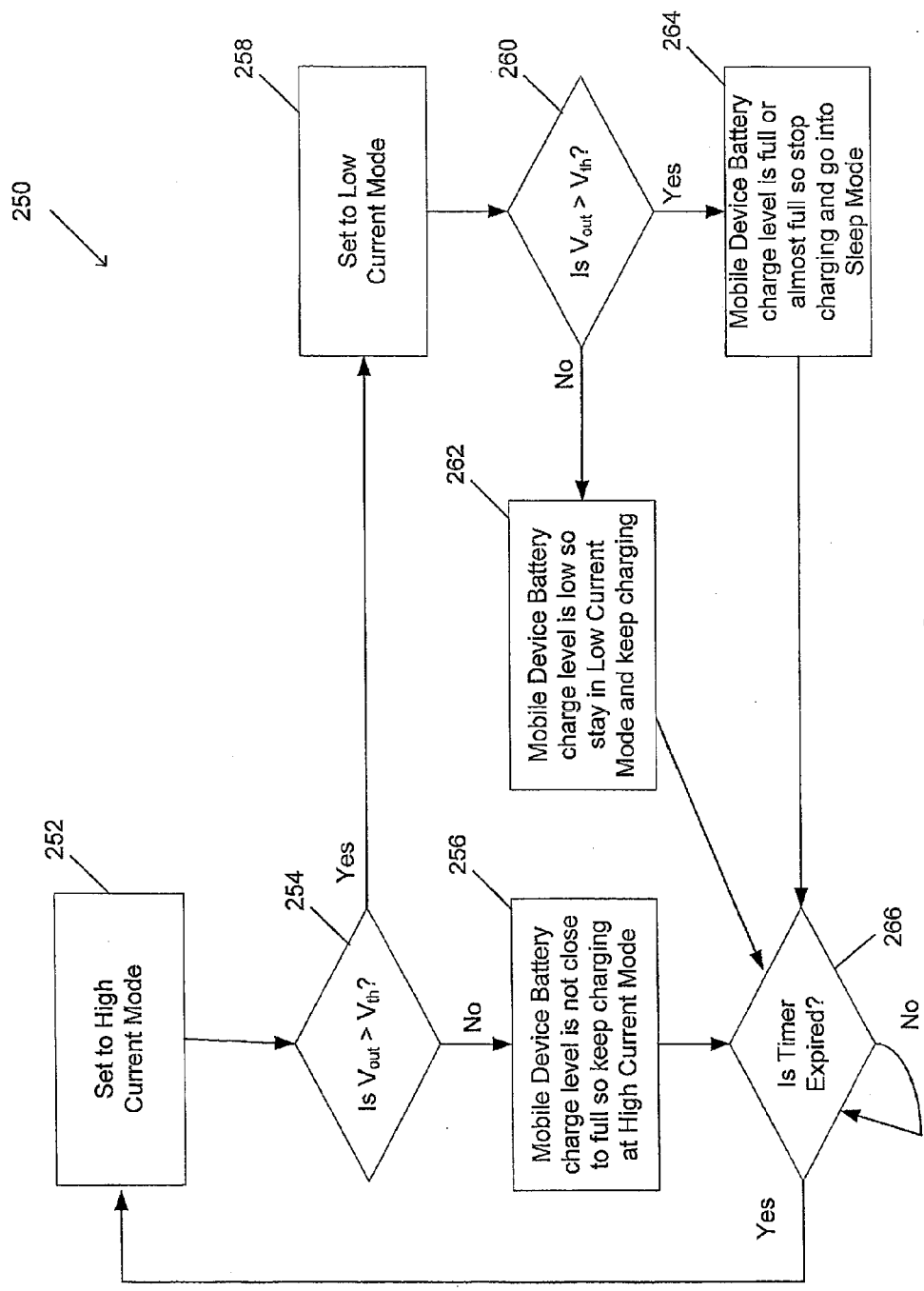
FIG. 4 is a flow chart diagram of an example embodiment of a charging method for charging a rechargeable battery of a mobile device.

Referring now to FIG. 4, shown therein is a flow chart diagram of an example embodiment of a charging method 250 for charging the mobile device 100. In this embodiment, the current source 204 has two adjustable current settings and can operate in a high current mode or a low current mode in which the current source 204 provides the charging current $I_{charge}$ at a first amplitude or a second amplitude respectively. The second amplitude is lower than the first amplitude. When the battery interface 132 uses a linear charger to charge the battery 130, the charging device 200 can indirectly detect the charge level of the battery 130 by detecting or measuring the amplitude of the output voltage $V_{out}$ at different current settings of the current source 204 which also allows the charging device 200 to determine whether the charging state of the rechargeable battery is the constant voltage charging state.

At step 252, the controller 202 sets the current source 204 to operate in the high current mode in which case the charging current $I_{charge}$ is generated at the first amplitude. At step 254, the controller 202 measures the output voltage $V_{out}$ and compares the output voltage $V_{out}$ with a voltage threshold $V_{th}$. If the amplitude of the output voltage $V_{out}$ is below the voltage threshold $V_{th}$, the charge level of the battery 130 is not at full charge capacity or close to being at full charge capacity because the charging current required by the battery 130 is greater than the charging current $I_{charge}$ that the charging device 200 can supply. This is because the high current setting of the current source 204 is still lower than the current amplitude associated with the fast-charge current setting. In this case, the output voltage $V_{out}$ will be pulled down to a certain level that is just above the voltage of the battery 130. This reduces the voltage drop on the battery interface 132, which improves the charging efficiency. Since the power loss on a linear battery charger is $P_{loss}=(V_{old}-V_{battery})\cdot I_{charge}$, the smaller the voltage difference between the output voltage $V_{out}$ of the charging device 200 and the voltage of the rechargeable battery 130 $V_{battery}$, the smaller the power loss. This increases efficiency and also helps in preventing the battery interface from becoming overheated.

For instance, if the battery voltage $V_{battery}$ is 4.0 V and the output voltage $V_{out}$ of the charging device 200 and output current $I_{charge}$ of the charging device 200 are 5.0 V and 300 mA respectively, the voltage drop and power loss on the battery interface 132 is 1 V and 300 mW (i.e. 300 mW=(5 V−4 V)·300 mA). However, if the output voltage $V_{out}$ is pulled down to a certain level just above the battery voltage level $V_{battery}$, i.e. to reduce voltage drop, as is done in the example embodiments described herein, because the current that the battery 130 needs is greater than the 300 mA the charging device 200 can supply, the power loss on the battery interface 132 is equal to: $P_{loss}=I_{charge}^2 \cdot Rds$. The resistance Rds is the FET drain-to-source resistance of the battery interface 132 which is usually less than 100 mΩ for battery charger chips. Then the voltage drop and power loss on the battery interface 132 is 0.03 V (i.e. 300 mA·100 mΩ) and 9 mW (i.e. 9 mW=300 mA·300 mA·100 mΩ) respectively, which is only 3% of the power loss when charging with a 5 V output. The temperature rise on the battery interface 132 is proportional to the power loss which means that if the output voltage $V_{out}$ of the charging device 200 is pulled down to a certain level just above the battery voltage level $V_{battery}$, the temperature rise will be only approximately 3% of that encountered in 5 V output charging.

The charging method 250 then goes to step 256 and the controller 202 keeps charging the battery 130 while the current source 204 operates at the high current mode.

Alternatively, if at step 254 the output voltage $V_{out}$ is determined to be more than the voltage threshold $V_{th}$, the charging method 250 goes to step 258 and the controller 202 sets the current source 204 to operate in the low current mode in which case the charging current $I_{charge}$ is generated at the second amplitude. At step 260, the controller 202 compares the output voltage $V_{out}$ with the voltage threshold $V_{th}$. If the amplitude of the output voltage $V_{out}$ is below the voltage threshold $V_{th}$, the charge level of the battery 130 is low because the low current amplitude of the charging current $I_{charge}$ is less than the amplitude associated with the pre-charge current setting. In this case, the charging process is in the preliminary charging state. The charging method 250 then goes to step 262 and the controller 202 keeps charging the battery 130 while the current source 204 is operating in the low current mode. In an alternative, the high current mode can be used when the charging device 200 detects that the battery 130 is in the preliminary charging state. Although the charging efficiency of the high current mode is lower than that of the low current mode, the overall efficiency is almost the same because the preliminary charging period is much shorter than the total charging period.

Alternatively, if at step 260 the controller 202 determines that the amplitude of the output voltage $V_{out}$ is above the voltage threshold $V_{th}$, the charging method 250 goes to step 264. The charging process is in the constant voltage charging state. In this case, the battery 130 is at full charge capacity or almost at full charge capacity. In this situation, since the current that the charging device 200 supplies is less than the charge termination current of the battery 130, the charging current $I_{charge}$ is then cut off and charging is terminated. The output voltage $V_{out}$ will then go up to the charging device regulated voltage of the charging device 200. This results in a power savings, and hence a more efficient charging process.

Whenever the charging method 250 is at one of steps 256, 262 and 204, the charging method 250 goes to step 260 at which point the charging method 250 waits for a certain period of time such as one minute for example before going back to step 252 to determine the charge level of the battery 130 and whether the battery 130 requires charging. This allows the controller 202 to keep checking the charge level of the battery 130 on a regular time basis in order to turn on the current source 204 right away when the charge level of the battery 130 begins to drop and to turn off the current source 204 right away when the charge level of the battery 130 is close to being at full charge capacity.

The settings that are used for the amplitudes of the current and the voltage threshold relate to the curves shown in FIG. 2, as well as device specific parameters as will now be explained. The first amplitude of the charging current $I_{charge}$ is set between the amplitudes associated with the pre-charge current setting and the fast charge current setting, and the second amplitude of the charging current $I_{charge}$ is set below the amplitude associated with the pre-charge current setting. The voltage threshold $V_{th}$ is selected to be greater than a minimum charging device voltage which is the voltage required to charge the battery 13D to full capacity. The minimum charging device voltage can also be defined as being the voltage of the battery 130 plus the voltage drop across the battery interface 132. The voltage threshold $V_{th}$ is also selected to be less than a charging device regulation voltage which is the voltage that the charging device 200 prefers to use when charging the battery 13D, i.e. the output voltage that would have occurred if the charging current $I_{charge}$ provided by the charging device 200 was greater than the actual charging current that the mobile device 100 needs. In the example embodiment shown in FIG. 5, the first and second amplitudes of the charging current $I_{charge}$ are about 300 mA and 50 mA respectively, and the voltage threshold $V_{th}$ is about 4.5 V.

Figure 5:
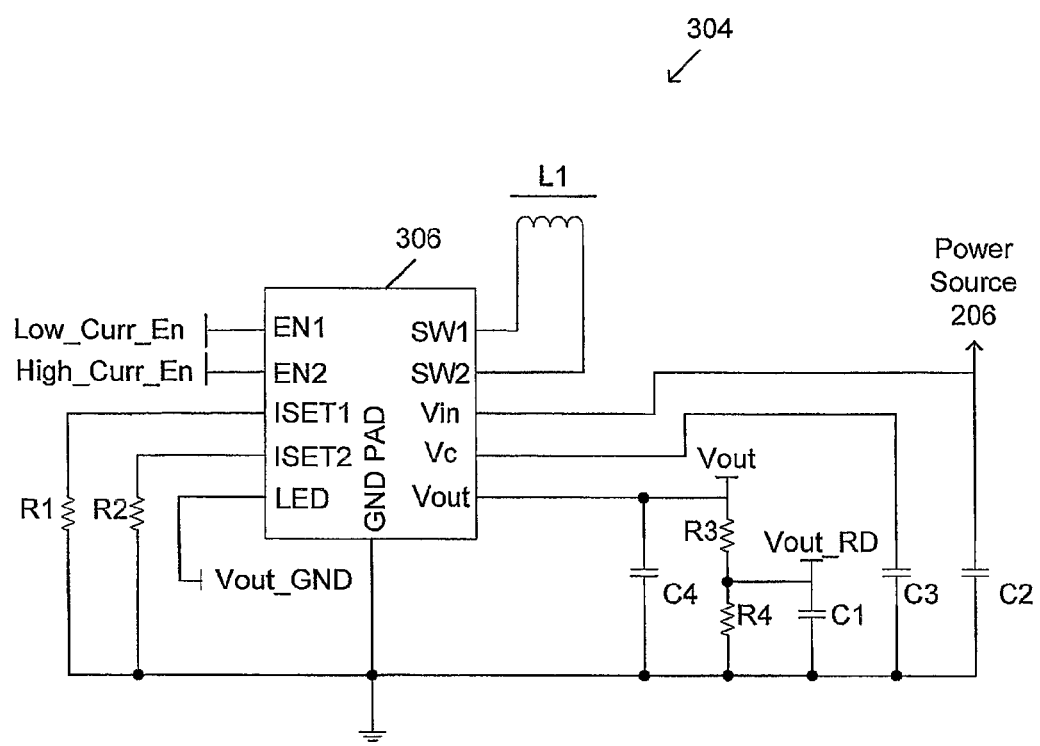
FIG. 5 is a circuit diagram of an example embodiment of a current source that can be used in the charging device of FIG. 3 according to the charging method of FIG. 4.
Figure 6:
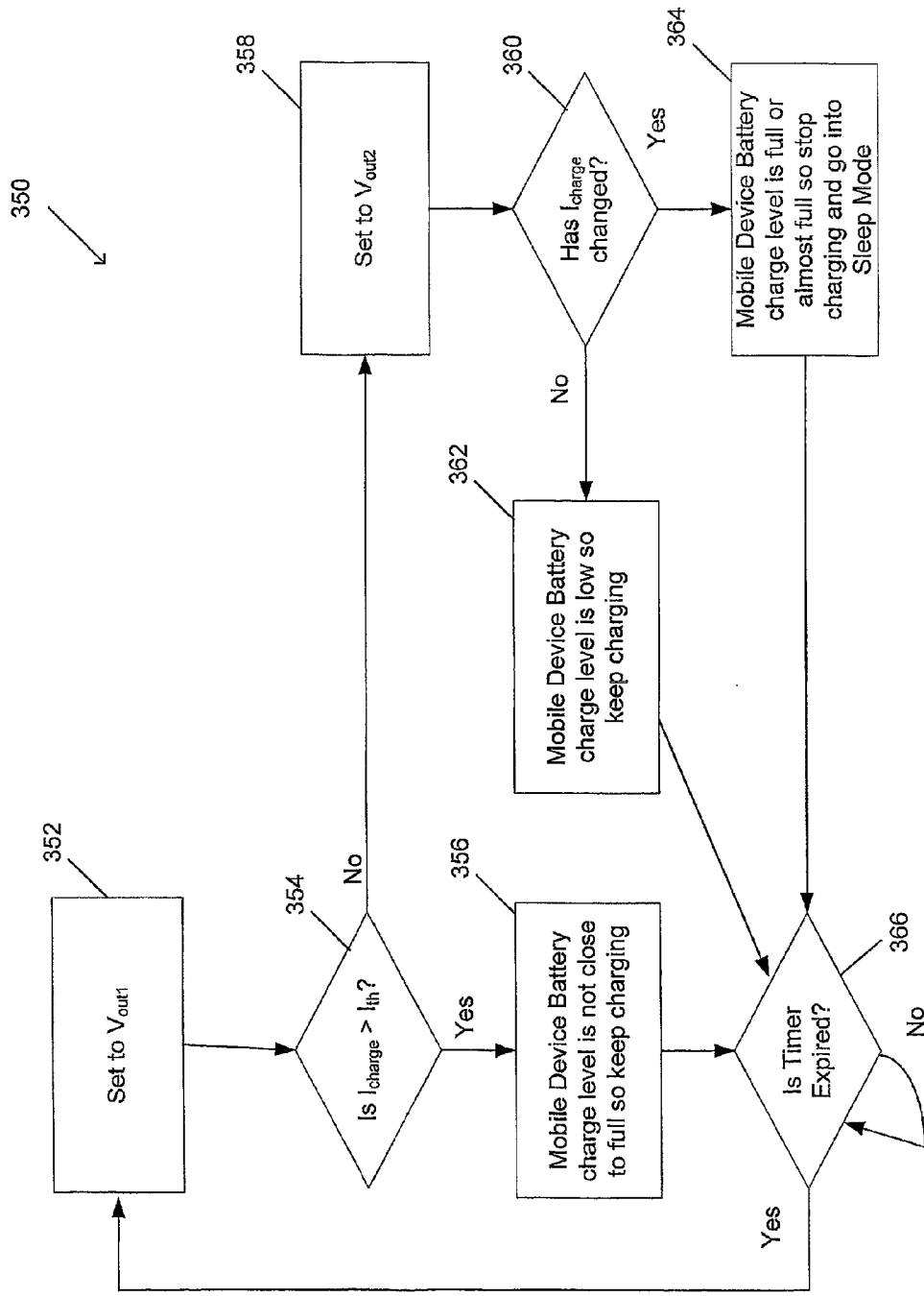
FIG. 6 is a flow chart diagram of another example embodiment of a charging method for charging a rechargeable battery of a mobile device.

Referring now to FIG. 5, shown therein is a circuit diagram of an example embodiment of a current source 304 that can be used in the charging device 200 according to the charging method 250. The current source 304 includes a buck-boost DC-DC switched converter 306 that is configurable to provide two different amplitudes for the charging current $I_{charge}$. The current source 304 further includes resistors R1 to R4, inductor L1, and capacitors C1 to C4. In this example embodiment, the buck-boost DC-DC switched converter 306 is the LTC3454 1A synchronous Buck-Boost high current LED driver made by Linear Technology (Milpitas, Calif., USA), however, in other implementations, other buck-boost converters that provide similar functionality can be used. General guidelines on selecting values for the components shown in FIG. 5 can be obtained by referring to the datasheet for the LTC3454 converter.

The inputs EN1 and EN2 of the converter 306 are provided by the controller 202 and are used to control whether the converter 300 is operating in high current mode (input 300 mA_EN is enabled and input 50 mA_EN is disabled) or low current mode (input 300 mA_EN is disabled and input 50 mA_EN is enabled). The magnitude of the resistors R1 and R2 are used to control the amplitude of the charging current provided by the converter 306 in low and high current modes respectively. In this example implementation, for 300 mA and 50 mA charging currents, resistor R2 can have a resistance of 10 kΩ and resistor R1 can have a resistance of 60.4 kΩ. The resistors R1 and R2 are connected to the ISET1 and ISET2 inputs of the converter 306 respectively.

The LED output pin of the converter 306 is connected to ground and also provides the ground node connection VOUT_GND of the connection to the battery interface 132. The Vout output pin of the converter 306 provides the $V_{out}$ node, which is connected to the other terminal of the battery interface 132 to provide the charging current thereto. The Vin input pin of the converter 306 is connected to the power source 206 and the capacitor C2. The SW1 and SW2 pins of the converter 306 are connected to the inductor L1. The inductor L1 is used to store and provide energy during the switching process employed by the buck-boost DC-DC switched converter 306. The inductor L1 can have an inductance of 10 µH. The ground pin GND PAD is connected to ground.

The Vc pin is connected to the capacitor C3. The Vc pin can be used to provide a compensation point for internal error for amplification within the converter 306. Resistors R3 and R4 provide a resistive divider network for allowing the controller 202 to make a measurement of the output voltage $V_{out}$ during the execution of the charging method 250. The capacitor C1 is used to reduce noise in the measurement of the output voltage $V_{out}$. The capacitor C2 smoothes the voltage from the power source 206. The capacitor C4 is used to smooth the voltage provided on the output node to the battery interface 132. In an example implementation, the resistors R3 and R4 can have resistances of 100 kΩ and 30.1 kΩ respectively, and the capacitors C1, C2, C3 and C4 can have capacitances of 0.01 µF, 10 µF, 0.1 µF and 10 µF respectively. However, it may be possible to use other values for the circuit components to implement a working version of this embodiment.

The controller 202 has an internal timer which can be used to awaken the current source 304 from sleep mode during a timeout. An external oscillator can be used to save more power during the sleep mode, but it adds cost.

In an alternative embodiment, the charging device first sets the current source to operate in high current mode and then measures the level of the output voltage $V_{out}$. If $V_{out}$ is below the threshold $V_{th}$, then the charging device keeps charging the battery 130. If $V_{out}$ is above the threshold $V_{th}$, then the battery 130 is either in the preliminary charging state or the constant voltage charging state. The charging device will then set the current source to operate in the low current mode and measure the output voltage $V_{out}$ again. Because a) the voltage level of the battery 130 will be below 3.0 V or so when it is in the preliminary charging state, b) the voltage level of the battery 130 will be around 4.2 V or so when it is in the constant voltage charging state, and c) the output voltage $V_{out}$ will be the voltage level of the battery 130 plus a small voltage drop across the battery interface 132, a voltage threshold $V_{th}$ can be set between 3.0 V and 4.2 V, say 3.7 V for example. If the measured output voltage $V_{out}$ is above the voltage threshold $V_{th}$, the charging device can stop charging the battery 130 because the battery 130 is in the constant voltage charging state. Otherwise, the charging device can keep charging the battery 130 because it is in the preliminary charging state. The low current setting does not need to be less than the charge termination current in this case. This scheme can be used for a mobile device that does not dynamically reduce the level of the charging current $I_{charge}$ when it detects that the voltage applied on its battery interface drops below a preset level.

Referring now to FIG. 3, shown therein is a flow chart diagram of another example embodiment of a charging method 350 for charging the mobile device 100. In this embodiment, the current source 204 has two adjustable output voltage settings at first and second amplitudes. The second amplitude is lower than the first amplitude. When the battery interface 132 uses a linear charger to charge the battery 130, the charging device 200 can detect the charge level of the battery 130 by detecting the amplitude of the charging current $I_{charge}$ at different output voltage settings of the current source 204.

At step 352, the controller 202 sets the output voltage $V_{out}$ of the current source 204 at the higher amplitude $V_{out1}$. At step 354' the controller 202 measures the charging current $I_{charge}$ and compares it with a charging current threshold $I_{th}$. If the amplitude of the charging current $I_{charge}$ is above the charging current threshold $I_{th}$, the charge level of the battery 130 is not at full charge capacity or close to being at full charge capacity. In this case, the controller 202 will keep the output voltage $V_{out}$ at $V_{out1}$ and the charging device 200 will keep charging the battery 130. When the charging current $I_{charge}$ is greater than the maximum current setting $I_{max}$, the output voltage level $V_{out}$ will be pulled down no matter whether it is set at a high or a low setting because at that time, the charging current $I_{charge}$ that the charging device 200 can supply is always less than the charging current that the battery 130 needs. Accordingly, the output voltage $V_{out}$ will be pulled down automatically to somewhere just above the voltage level of the battery 130 plus the voltage drop or the battery interface 132. This results in a reduction of the power loss on the battery interface 132 and hence more efficient charging.

Alternatively, if at step 354 the amplitude of the charging current $I_{charge}$ is determined to be less than the charging current threshold $I_{th}$, the charging method 350 goes to step 358 and the controller 202 sets the output voltage $V_{out}$ of the current source 204 to the second smaller amplitude $V_{out2}$. At step 360, the controller 202 re-measures the amplitude of the charging current $I_{charge}$ and determines whether it has changed appreciably from the previous measurement of the charging current. If the amplitude of the charging current $I_{charge}$ is similar to the previous measurement (i.e. there is less than a 15% change for example, but it should be noted that a 20% or 30% change may also work in certain cases), the charge level of the battery 130 is low. This is because the voltage of the battery 130 plus the voltage across the charging device 200 is lower than the output voltage $V_{out2}$ and the charging current $I_{charge}$ stays at approximately the same level. In this case, the charging process is in the preliminary charging state. The charging method 350 then goes to step 362 and the controller 202 keeps charging the battery 130 while providing the same charging current $I_{charge}$.

Alternatively, if at step 360 the controller 202 determines that the amplitude of the charging current $I_{charge}$ has substantially reduced, such as being near 0 mA, the charging method 350 goes to step 364. In this case, the voltage of the battery 130 plus the voltage across the battery interface 132 is higher than the output voltage $V_{out2}$ and there is hardly any charging current that goes from the charging device 200 to the mobile device 100. The controller 202 realizes that the battery 130 is at full charge capacity or almost full charge capacity and that the charging process is in the constant voltage charging state. The controller 202 then instructs the current source 204 to stop providing the charging current $I_{charge}$ and to go into sleep mode. This results in a power savings, and hence a more efficient charging process.

Whenever the charging method 350 is at one of steps 355, 362 and 364, the charging method 350 goes to step 366 at which point the charging method 350 waits for a certain period of time such as one minute for example before going back to step 352 to determine the charge level of the battery 130 and whether the battery 130 requires charging. This allows the controller 202 to keep checking the charge level of the battery 130 on a regular time basis in order to turn on the current source 204 right away when the charge level of the battery 130 begins to drop and to turn off the current source 204 right away when the charge level of the battery 130 is close to being at full charge capacity.

Figure 7:
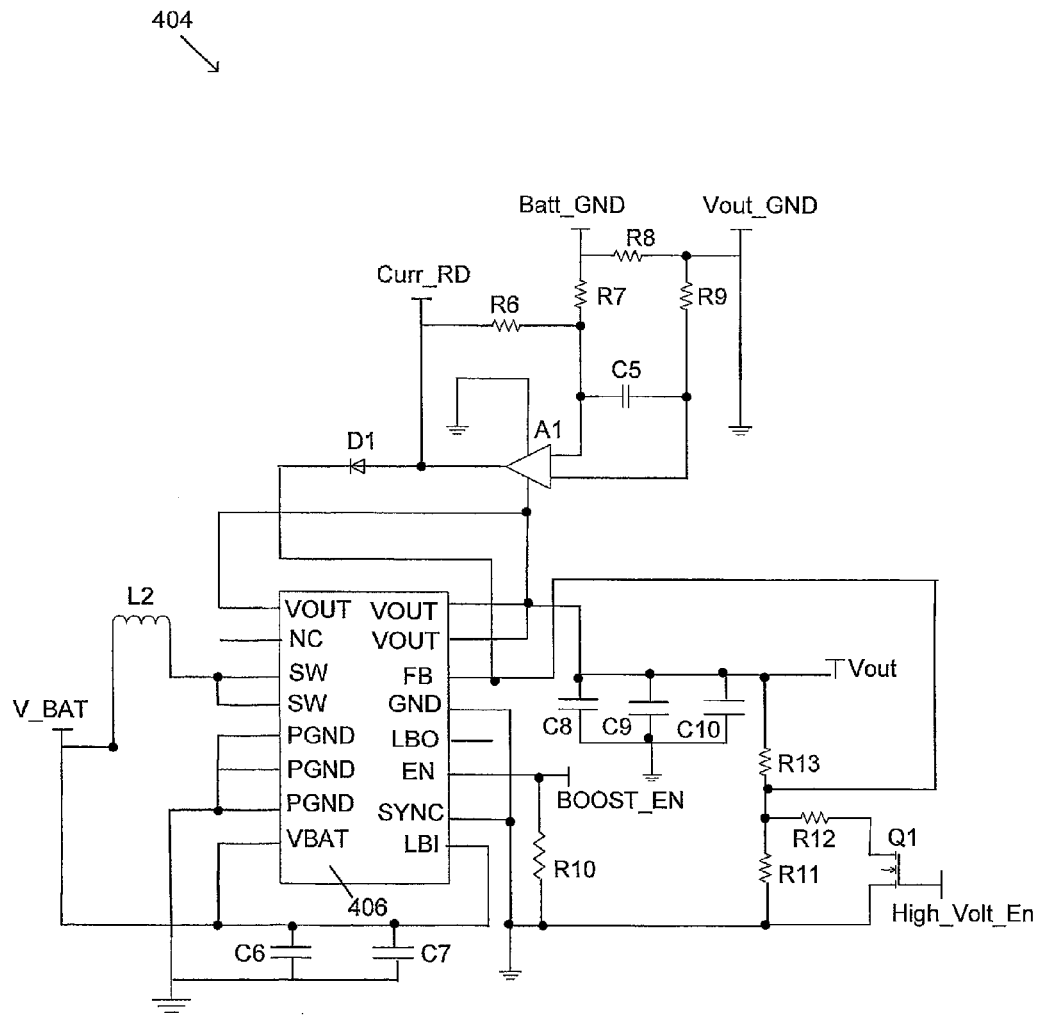
FIG. 7 is a circuit diagram of an example embodiment of a current source that can be used in the charging device of FIG. 3 according to the charging method of FIG. 6.

Referring now to FIG. 7, shown therein is a circuit diagram of an example embodiment of a current source 404 that can be used in the charging device 200 according to the charging method 350. The current source 404 includes a switched boost converter 406 that can provide the Charging current $I_{charge}$. The current source 404 further includes resistors R6 to R13, capacitors C6 to C10, inductor L2, diode D1, amplifier A1 and transistor Q1. The node V_BAT is connected to the positive terminal of the power source 206 and the node Bat_GND connects to the other terminal of the power source 206. The nodes Vout and Vout_GND connect to the terminals of the battery interface 132. The node CURR_RD is used to make a measurement of the charging current $I_{charge}$ being used by the mobile device 100.

In this example embodiment, the switched boost converter 406 is the TPS61030 boost converter made by Texas Instruments (Dallas, Tex., USA). The amplifier A1 is the TLV2711 operational amplifier made by Texas Instruments, the diode D1 is the small signal Schottky diode BAT54CW made by ST microelectronics (Geneva, Switzerland), and the transistor Q1 is the FDG6303N Dual N-channel digital FET made by Fairchild Semiconductors (South Portland, Me., USA). However, in other implementations, other components that provide similar functionality can be used.

The resistors R6 to R9, the capacitor C5, the diode D1 and the amplifier A1 form a current comparison and measurement block. These components are used to set the maximum charging current $I_{max}$. The threshold current $I_{th}$, is set by the controller 202 and can be any value less than $I_{max}$. For instance, the controller 202 can set $I_{th}$ to 200 mA and detect the level of $I_{charge}$ by measuring the voltage level on the node CURR_RD, which is proportional to the level of $I_{charge}$. The controller 202 keeps $V_{out}$ at this higher level when $I_{charge}$ is greater than $I_{th}$ and changes $V_{out}$ to the lower level when $I_{charge}$ drops less than $I_{th}$.

The output of the amplifier A1 goes up if the charging current $I_{charge}$ increases in amplitude and the output of the amplifier A1 goes down if the charging current $I_{charge}$ decreases in amplitude. When $I_{charge}$ reaches the maximum charging current setting $I_{max}$, the voltage on the node CURR_RD goes high enough to turn the diode D1 on. Then the feedback pin FB of the switched boost converter 406 is controlled by the voltage on node CURR_RD and the level of $I_{charge}$ is clamped at the $I_{max}$ level and the charging device 200 goes to the constant current mode. When the level of $I_{charge}$ goes below $I_{max}$, the voltage on the node CURR_RD will not be high enough to keep the diode D1 on. The diode D1 then turns off and the feedback pin FB of the switched boost converter 406 is controlled by the resistor network of R11, R12 and R13. The charging device 200 then goes to the constant voltage mode at that time.

The charging current $I_{charge}$ is measured by the controller 202 on the node CURR_RD. If the level (i.e. amplitude) of $I_{charge}$ is greater than the threshold current $I_{th}$, the charging device 200 keeps charging the battery 130. Otherwise, the controller 202 turns off the transistor $Q_1$ to disconnect the resistor R12 from ground. Then the output voltage $V_{out}$ is dictated by the resistors R11 and R13 and the output voltage $V_{out}$ goes to 4.2 V. The charging current $I_{charge}$ is measured again. If the battery 130 is in the preliminary charging state, the current source 404 continues to provide current to the mobile device 100, but if the battery 130 is in the constant voltage charging state, the amplitude of the charging current $I_{charge}$ reduces to near 0 mA and the switched boost converter 406 stops providing current to the mobile device 100, and enters sleep mode. In this case, the resistor R10 acts like a pull down resistor to pull the input pin EN of the switched boost converter 406 to ground so that the switched boost converter 406 enters sleep mode. However, the pin EN also receives a BOOST_EN signal from the controller 202 to enable the switched boost converter 406 so that it leaves sleep mode. The controller 202 can also make the switched boost converter regulator 406 go to sleep mode by setting the BOOST_EN signal to "0".

The inductor L1 is used for storing and providing energy during the switching process employed by the switched boost converter 400. The capacitors C6 and C7 are used for smoothing the voltage from the power source 206. The capacitors C8, C9 and C10 are used for smoothing the output voltage Vout. The node V_BAT is connected to the power source 206.

The controller 202 also provides a control signal VCNTRL to the transistor Q1 to control the amplitude of the output voltage $V_{out}$. If the control signal VCNTL is set to "1", the transistor Q1 conducts and the output voltage $V_{out}$ goes to the higher amplitude $V_{out1}$. If the controller sets the control signal VCNTL to "0", the transistor Q1 turns off and the output voltage $V_{out}$ goes to the smaller amplitude $V_{out2}$.

In this example implementation, the resistors R6 to R12 have resistances of 3 kΩ, 1 kΩ, 0.768Ω, 1 kΩ, 100 kΩ, 178 kΩ, 787 kΩ, and 1300 kΩ respectively. The capacitors C5 to C10 have capacitances of 0.01 µF, 10 µF, 0.1 µF, 47 µF, 47 µF, and 2.2 µF respectively. The inductor L1 has an inductance of 10 µH. This provides first and second amplitudes of 5 and 4.2 V respectively for the output voltage $V_{out}$ and the maximum current $I_{max}$ is set to 300 mA. However, it may be possible to use other values for the circuit components to implement a working version of this embodiment.

In this example implementation, the switched boost converter 406 provides current at about 300 mA when it is enabled. This is close to the amount of current that is drawn by the mobile device 100 when the user makes a phone call or transfers data. Accordingly, the current source 404 provides enough charging current when the mobile device 100 is connected to the charging device 200 in the event that the user may be using the mobile device 100. The provision of a higher amplitude charging current $I_{charge}$ will generally charge the battery 130 faster, but this makes the components of the current source 404 larger and more expensive. Also, if the charging device 200 is implemented with the holster for the mobile device, since most of the time the mobile device 100 is sitting in the holster, a charging current of 300 mA will be sufficient.

In addition, the output voltage $V_{out1}$ can be set to be greater than the minimum charging device voltage, which is the voltage required to charge the battery 130 to full capacity. The minimum charging device voltage can be defined as the minimum voltage applied to the battery interface 132 to fully charge the battery 130. The minimum charging device voltage is not the battery voltage when the battery 130 is fully charged and, as discussed, a voltage does not have to keep being applied to the battery interface 132 until the battery 130 is fully charged. The output voltage $V_{out2}$ can be set to be greater than the pre-charge voltage setting but less than the minimum charging device voltage, The pre-charge voltage setting is generally around 2.8 V to 3.1 V set by the battery interface 132. The minimum charging device voltage can be around 4.5 V; once again this depends on the battery interface 132. The charging device regulation voltage is the voltage that the charging device 200 prefers to use when charging the battery 130; i.e. the output voltage that would have occurred if the charging device 200 provided the charging current $I_{charge}$ at a level that is greater than the actual charging current that is required by the mobile device 100. The charging device 200 can keep charging the battery 130 until it is almost full or full. At this time, the output voltage of the charging device 200 will be at the charging device regulation voltage which is generally around 5V; once again depending on the specifics of the charging device 200. Accordingly, the voltage $V_{out1}$ is set to be greater than the minimum charging device voltage setting in order to charge the battery 130 to full or almost full. The voltage $V_{out2}$ is set to be between the pre-charge voltage setting and the minimum charging device voltage in order to detect whether the battery 130 is in the preliminary charging state.

The settings that are used for the amplitudes of the current and the voltage threshold relate to the curves shown in FIG. 2, as well as device specific parameters as will now be explained in the next two paragraphs. The charging current threshold $I_{th}$ is set to be greater than the pre-charge current setting and less than the maximum current $I_{max}$. For example, the charging current threshold $I_{th}$ can be set low, to 200 mA for example, but the charging current $I_{charge}$ will be cut off at 200 mA. This setting can result in more energy being provided to the battery 130, but there is a reduction in the charging efficiency because the charging device 200 operates in the constant voltage charging state for a longer period of time. If the charging current threshold is set a bit higher, at 250 mA for example, the charging current $I_{charge}$ will be cut off at 250 mA. This setting can result in a small reduction in the energy that is provided to the battery 130, but improves the charging efficiency because the charging device 200 operates in the constant voltage mode for a shorter amount of time. It should be noted that for the current source 304, the charging current $I_{charge}$ is disabled as soon as a transition into the constant voltage charging state is detected. However, for the current source 404, the charging current $I_{charge}$ is still enabled for a certain amount of time when there is a transition into the constant voltage charging state because there is some tolerance that is incorporated into the value of the current threshold $I_{th}$ to compensate for the tolerance of the components that are used in the circuitry and to prevent or reduce the likelihood of any false triggering. Accordingly, the current threshold $I_{th}$ is set below the maximum current $I_{max}$. However, the charging current $I_{charge}$ is disabled when it drops below a certain level that is below the typical value of $I_{max}$ minus all of the effects due to the possible tolerance of the circuit components.

In an alternative embodiment, the controller 202 and the current source 404 can be used with another technique to detect the charging state of the rechargeable battery 130 in order to determine whether to keep charging the rechargeable battery 130. In this case, the controller 202 is configured to set the output voltage $V_{out}$ to 5 V and measure the charging current $I_{charge}$ at the node CURR_RD. If the amplitude of the charging current $I_{charge}$ is below the amplitude associated with the pre-charge current setting, the controller 202 stops charging the rechargeable battery 130. Otherwise, the controller 202 keeps charging the rechargeable battery.

Figure 8:
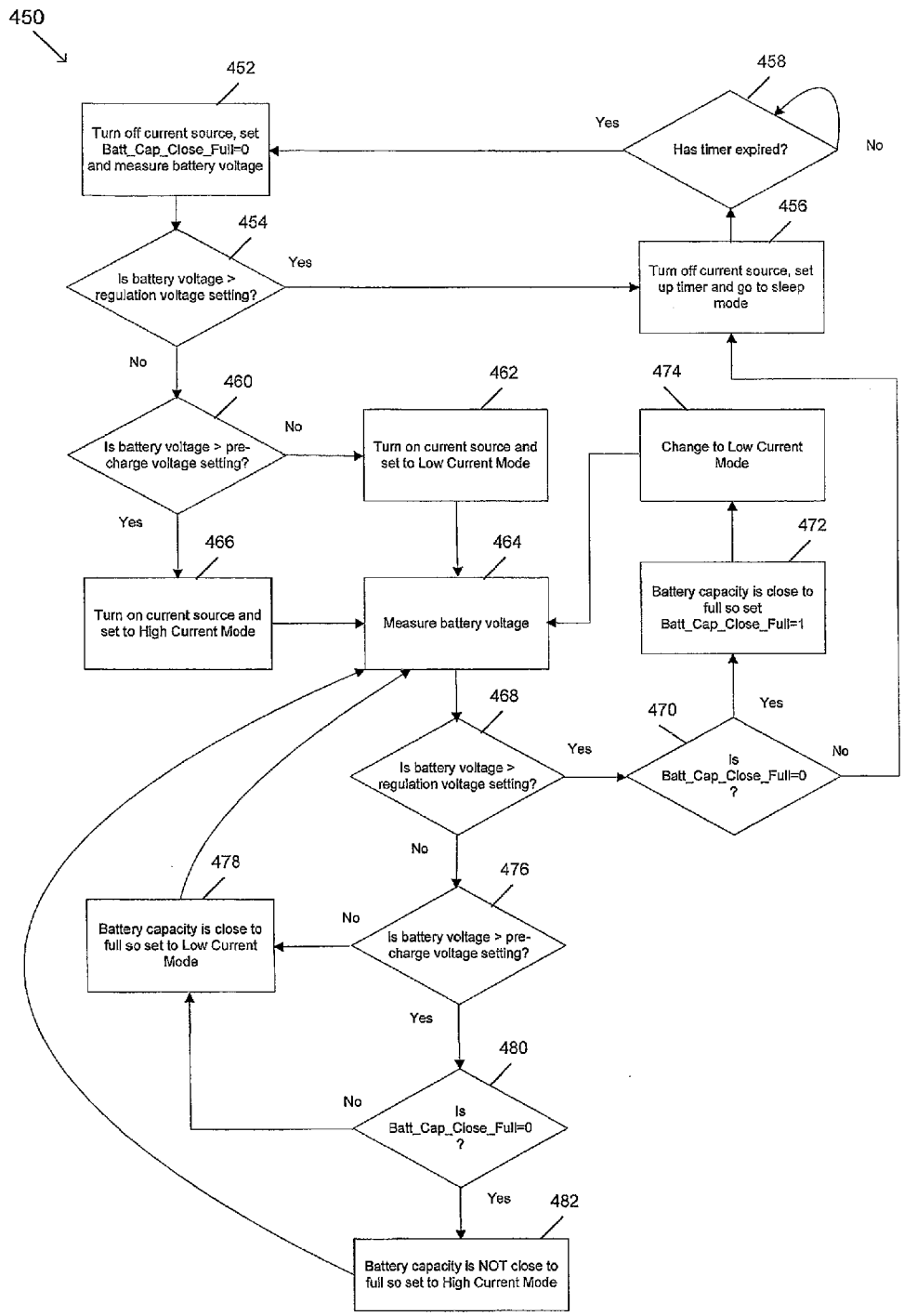
FIG. 8 is a flow chart diagram of an example embodiment of a charging method for charging a rechargeable battery of a mobile device without a battery interface.

The battery charging technique described previously in which the current can be varied to detect the battery charging state can also be applied to a battery that does not have the battery interface 132. In this case, the improvement in charging efficiency by reducing the output voltage of the charging device 200 to the battery voltage still holds true although the technique is modified in several ways. Referring now to FIG. 8, shown therein is a flow chart diagram of an example embodiment of a charging method 500 for 450 for charging a rechargeable battery that does not have a battery interface (i.e. element 132 in FIG. 3 is not present).

Steps 452 to 458 of method 450 are included as an initial check to determine whether the battery needs to be recharged. Accordingly, steps 452 to 458 are done prior to charging to see if it is safe to charge the battery. In the previous embodiments, these steps were not needed because the battery interface 132 provided this functionality and indicated when battery charging is required.

Steps 452 to 458 collectively involve measuring the output voltage at the output node of the current source, allowing charging if the measured output voltage is lower than a first voltage threshold or not allowing charging if the measured output voltage is higher than the first voltage threshold. The first voltage threshold is the regulation voltage setting as indicated in FIG. 2. In other cases, other values may be selected for the thirst voltage threshold. If charging is allowed, the method 450 moves to step 460. Otherwise, if charging is not allowed, the method 450 cycles from steps 452, 454, 456, 458 and back to 452 until the battery requires charging. As part of initialization, a parameter Batt_Cap_Close_Full is set to zero at step 452 to indicate that the capacity of the battery is not close to being full. When the parameter Batt_Cap_Close_Full is set to one, this indicates that the capacity of the battery is close to being full and that the battery voltage is greater than the regulation voltage setting.

If charging is allowed, the method 450 sets the current source 204 to provide the charging current at a first amplitude (i.e. high current mode) at step 466 if it is determined at step 460 that the measured output voltage is greater than a second voltage threshold. Otherwise, the method 450 sets the current source 204 to provide the charging current at a second amplitude (i.e. low current mode) if the measured output voltage is less than the second voltage threshold. The second voltage threshold is the pre-charge voltage setting which is shown in FIG. 2. The first amplitude is between current amplitudes associated with the pre-charge current setting and the fast-charge current setting of the mobile device 100 and the second amplitude is below a max pre-charge current setting allowed with the battery 130. This is to protect the battery from being damaged. These current settings are also shown in FIG. 2. In other cases, it may be possible to use other values for the second voltage threshold and the first and second current amplitudes to vary the performance of the charging method 450. Since there is no battery interface, the mobile device can configure the values for the various thresholds and amplitudes. In the cases where there is a battery interface, this function can be done by the mobile device or the battery interface.

In either case, the method 450 moves to step 464 where it subsequently measures the output voltage. If at step 468 it is determined that the subsequently measured output voltage is greater than the regulation voltage setting the method 450 moves to step 470 and then onto step 456 where the current source 204 is disabled if the battery capacity is determined to be near full (i.e. the parameter Batt_Cap_Close_Full is one) at step 470. Alternatively, the method 450 moves from step 470 to steps 472, 474 and 484 where collectively the current source 204 is set to provide the charging current at the second amplitude (i.e. low current mode), the battery capacity is indicated as being near full (i.e. the parameter Batt_Cap_Close_Full is set to one) and an additional output voltage measurement is performed if the battery capacity is determined to be not near full (i.e. the parameter Batt_Cap_Close_Full is zero) at step 470.

If it is determined that the subsequently measured output voltage is less than the regulation voltage setting at step 468 and less than the pre-charge voltage setting at step 476, the method 450 goes to step 478 at which point the current source 204 is set to provide the charging current at the second amplitude (i.e. low current mode) and then perform the additional output voltage measurement at step 464.

If it is determined that the subsequently measured output voltage is less than the regulation voltage setting at step 468 and greater than the pre-charge voltage setting at step 476, the method 450 goes to step 478 and sets the current source to provide the charging current at the second amplitude (i.e. low current mode) and perform the additional output voltage measurement at step 464 if the battery capacity is determined to be near full (i.e. the parameter Batt_Cap_Close_Full is one) at step 480. Otherwise, If it is determined that the subsequently measured output voltage is less than the regulation voltage setting at step 468 and greater than the pre-charge voltage setting at step 476, the method 450 goes to step 482 and sets the current source to provide the charging current at the first amplitude (i.e. high current mode) and perform the additional output voltage measurement at step 464 if the battery capacity is determined to not be near full (i.e. the parameter Batt_Cap_Close_Full is zero) at step 480.

The battery charging method 450 employs a technique to ensure that the battery voltage measurements are being correctly taken because the battery has internal resistance which can affect the battery voltage measurement. As seen in steps 472 and 478 whenever it is determined that the battery capacity is close to being full, the current source 204 is set to the low current mode and the battery voltage is measured once more. If it is then determined that the battery voltage is greater than the regulation voltage setting then the battery capacity is truly close to being full and charging may then be terminated.

Various topologies for current sources can be used to implement the battery charging method 450. For example, the current source 304 can be used to implement the battery charging method 450. In this case, the same topology and component values can be used and the controller 202 is programmed to follow the steps of the battery charging method 450.

Figure 9:
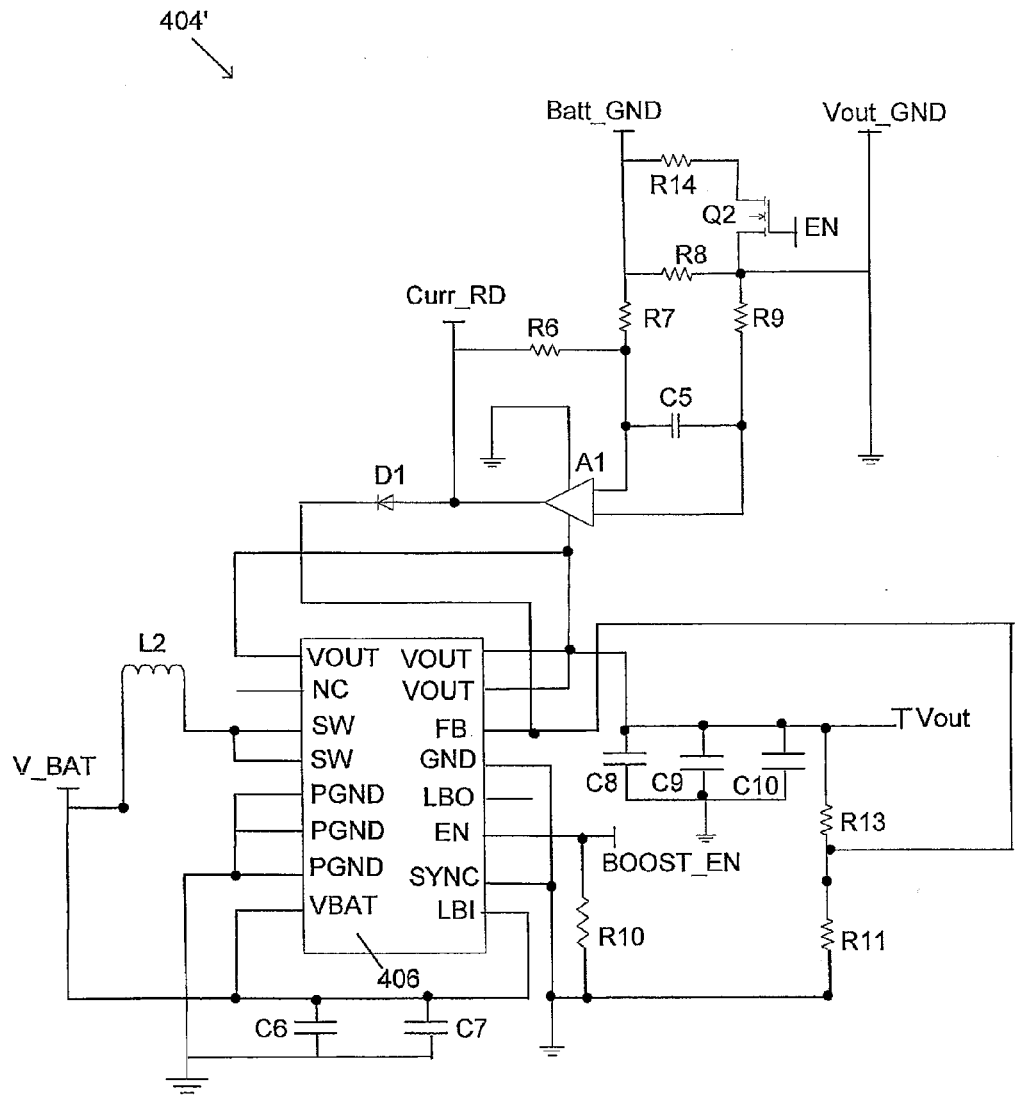
FIG. 9 is a circuit diagram of an example embodiment of a current source that can be used with the charging method of FIG. 7.

In an alternative, a variation of the current source 404 can be used in which the output current is provided at two different amplitudes (i.e. the current source is configured to operate in high current mode and low current mode). Referring now to FIG. 9, shown therein is a circuit diagram of an example embodiment of a current source 404' that can be used with the battery charging method 450. The current source 404' includes resistor R14 and transistor Q2 that are in series with one another and the series combination is in parallel with resistor RB to provide a different amplitude for the output current. Since there is no battery interface, the transistor Q1 and resistor R12 are no longer needed because the battery voltage can be directly measured from the battery. Also, the transistor Q1 and resistor R12 are not needed because there is no need to provide two different amplitudes for the output voltage (i.e. battery charging method 350 is not being followed). In alternative embodiments, the transistor Q1 and resistor R12 can be included with the current source 404' if it is desired to have a current source that can perform either the battery charging method 350 or the battery charging method 450.

In an example implementation, the values given previously for the components of the current source 404 can be used with the resistance of resistor R8 set instead to 2.26 Ohm. The resistance of resistor R14 can be 0.768 Ohm and the transistor Q2 can be a FET transistor. With these values, when output current at one amplitude is required, the transistor Q2 is disabled by the EN signal received from the controller 202 and a charging current with an amplitude of about 100 mA is provided. When output current at another amplitude is required, the transistor Q2 is enabled by the EN signal received from the controller 202 and a charging current with an amplitude of about 400 mA is provided.

In the example method embodiments described herein, the methods generally comprise indirectly determining a charging state of the rechargeable battery, configuring the current source to provide the charging current with an amplitude that is less than the charging current required by the rechargeable battery in the determined charging state; and then providing the charging current from the current source to the rechargeable battery at the lower amplitude to bring the output voltage of the current source towards the voltage of the rechargeable battery to reduce power dissipation thereby increasing charging efficiency.

In one aspect, according to at least one embodiment described herein, there is provided a charging device for charging a rechargeable battery. The charging device comprises a current source coupled to a power source and configured to provide a charging current to the rechargeable battery, and a controller configured to control the current source to provide the charging current with an amplitude that is less than the charging current required by the rechargeable battery in a given charging state to bring an output voltage of the current source towards the voltage of the rechargeable battery.

For example, the current source can be coupled to a battery interface of the rechargeable battery and the controller can be configured to vary the amplitude of the charging current provided by the current source, the variation including first and second amplitudes, the second amplitude being smaller than the first amplitude, and the controller being configured to measure an output voltage at an output node of the current source to determine whether the charging state of the rechargeable battery is a constant voltage charging state.

Alternatively, the current source can be coupled to a battery interface of the rechargeable battery and the controller can be configured to vary the amplitude of an output voltage at an output node of the current source, the variation including first and second amplitudes, the second amplitude being smaller than the first amplitude, and the controller being configured to measure an amplitude of the charging current to determine whether the charging state of the rechargeable battery is a constant voltage charging state.

In another alternative, when the battery does not have a battery interface, prior to charging the controller can be configured to measure an output voltage at an output node of the current source, allow charging if the measured output voltage is lower than a first voltage threshold or not allow charging if the measured output voltage is higher than the first voltage threshold.

In another aspect, according to at least one embodiment described herein, there is provided a method for charging a rechargeable battery. The method comprises:

determining a charging state of the rechargeable battery;

configuring a current source to provide a charging current with an amplitude that is less than the charging current required by the rechargeable battery in the determined charging state; and providing the charging current from the current source to the rechargeable battery at the lower amplitude to bring an output voltage of the current source towards the voltage of the rechargeable battery.

For example, the method can further comprise providing the charging current from the current source to the battery interface of the rechargeable battery, varying the amplitude of the charging current provided by the current source, the variation including first and second amplitudes, the second amplitude being smaller than the first amplitude, and measuring an output voltage at an output node of the current source to determine whether the charging state of the rechargeable battery is a constant voltage charging state.

Alternatively, the method can further comprise providing the charging current from the current source to a battery interface of the rechargeable battery, varying the amplitude of an output voltage at an output node of the current source, the variation including first and second amplitudes, the second amplitude being smaller than the first amplitude, and measuring an amplitude of the charging current to determine whether the charging state of the rechargeable battery is a constant voltage charging state.

In another alternative, when the battery does not have a battery interface, prior to charging the method can comprise measuring an output voltage at an output node of the current source, allowing charging if the measured output voltage is lower than a first voltage threshold or not allowing charging if the measured output voltage is higher than the first voltage threshold.

In yet another aspect, according to at least one embodiment described herein, there is provided a computer program product comprising a computer readable medium embodying program code means executable by a processor of a charging device for executing the preceding method of charging a rechargeable battery.

It should be understood that various modifications can be made to the embodiments described and illustrated herein, without departing from the embodiments, the general scope of which is defined in the appended claims. For instance, it is possible to use more than two current or voltage settings when detecting the charging state and charge level of the rechargeable battery. In addition, the charging device 200 may use a linear current source rather than the switching current sources described herein. Also, the charging device 200 may be used with a mobile device 10D that uses a switching battery charger interface rather than a linear battery charger interface. In addition, the various embodiments of the charging circuitry and charging techniques described herein can be applied to devices having more than one rechargeable battery. It should also be noted that the term "coupling" or "coupled" can be used to describe elements that are directly electrically connected to one another such as by a connector, for example, or that are electrically connected to one another via an intermediate element such as a resistor or a diode for example. It should further be understood that while the embodiments were described for a mobile device, the embodiments are generally applicable to any device that uses rechargeable batteries.

The invention claimed is:

1. A charging device for charging a rechargeable battery, wherein the charging device comprises:
a current source coupled to a power source and configured to provide a charging current to the rechargeable battery; and
a controller configured to indirectly determine a charging state of the rechargeable battery by either varying an amplitude of the charging current provided by the current source selected from a maximum of two current amplitudes, measuring an output voltage at an output node of the current source and comparing the measured voltage to a voltage threshold selected from a maximum of two voltage thresholds, or by varying an amplitude of the output voltage at the output node of the current source selected from a maximum of two voltage amplitudes, measuring the charging current provided by the current source, and comparing the measured current to a single current threshold, and the controller is further configured to control the current source to provide the charging current with an amplitude that is less than the charging current required by the rechargeable battery in the determined charging state to bring the output voltage of the current source towards a battery voltage of the rechargeable battery.

2. The charging device of claim 1, wherein the current source is coupled to a battery interface of the rechargeable battery, and the charging state of the rechargeable battery is determined by varying the charging current, the variation of the charging current including first and second amplitudes, the second amplitude being smaller than the first amplitude, and the controller is configured to subsequently measure the output voltage at an output node of the current source to determine whether the charging state of the rechargeable battery is a constant voltage charging state.

3. The charging device of claim 2, wherein the controller is configured to set the current source to provide the charging current at the second amplitude, compare the output voltage with the voltage threshold and determine that the charging state of the rechargeable battery is the constant voltage charging state when the output voltage is above the voltage threshold and to set the current source to operate in a sleep mode to stop charging the rechargeable battery when the charging state is determined to be the constant voltage charging state.

4. The charging device of claim 2, wherein the controller is configured to set the current source to provide the charging current at the first amplitude, compare the output voltage with the voltage threshold and allow the charging of the rechargeable battery when the output voltage is below the voltage threshold.

5. The charging device of claim 4, wherein if the comparison indicates that the output voltage is above the voltage threshold, the controller is configured to then set the current source to provide the charging current with the second amplitude and if the output voltage is then measured below the voltage threshold the controller is configured to determine that the charging state of the rechargeable battery is a preliminary charging state and allow the current source to continue providing the charging current to charge the rechargeable battery.

6. The charging device of claim 2, wherein the first amplitude is between current amplitudes associated with a pre-charge current setting and a fast-charge current setting and the second amplitude is below the pre-charge current setting.

7. The charging device of claim 3, wherein the voltage threshold is between a minimum charging device voltage and a charging device regulation voltage.

8. The charging device of claim 1, wherein the current source comprises a buck-boost DC-DC switched converter.

9. The charging device of claim 1, wherein the charging state of the rechargeable battery is determined by varying the charging current, the rechargeable battery does not have a battery interface and prior to charging the controller is configured to measure the output voltage at an output node of the current source, allow charging if the measured output voltage is lower than a first voltage threshold or not allow charging if the measured output voltage is higher than the first voltage threshold.

10. The charging device of claim 9, wherein if charging is allowed the controller is configured to control the current source to provide the charging current at a first amplitude if the measured output voltage is greater than a second voltage threshold and at a second amplitude if the measured output voltage is less than the second voltage threshold.

11. The charging device of claim 10, wherein the controller is configured to subsequently measure the output voltage and if the subsequently measured output voltage is greater than the first voltage threshold, the controller is configured to disable the current source if battery capacity is near full, and configure the current source to provide the charging current at the second amplitude, indicate the battery capacity is near full and perform an additional output voltage measurement if the battery capacity is not near full.

12. The charging device of claim 11, wherein if the subsequently measured output voltage is less than the first voltage threshold and less than the second voltage threshold the controller is configured to set the current source to provide the charging current at the second amplitude, and perform the additional output voltage measurement.

13. The charging device of claim 11, wherein if the subsequently measured output voltage is less than the first voltage threshold and greater than the second voltage threshold, the controller is configured to set the current source to provide the charging current at the second amplitude and perform the additional output voltage measurement if the battery capacity is near full, and set the current source to provide the charging current at the first amplitude and perform the additional output voltage measurement if the battery capacity is not near full.

14. The charging device of claim 10, wherein the first voltage threshold is a regulation voltage setting, the second voltage threshold is a pre-charge voltage setting, the first amplitude is between current amplitudes associated with a pre-charge current setting and a fast-charge current setting and the second amplitude is below a max pre-charge current setting allowed with the rechargeable battery.

15. The charging device of claim 1, wherein the current source is coupled to a battery interface of the rechargeable battery, and the charging state of the rechargeable battery is determined by varying the amplitude of the output voltage, the variation of the output voltage including first and second amplitudes, the second amplitude being smaller than the first amplitude, and the controller is configured to subsequently measure an amplitude of the charging current to determine whether the charging state of the rechargeable battery is a constant voltage charging state.

16. The charging device of claim 15, wherein the controller is configured to set the output voltage with the second amplitude, and if the controller measures a substantial reduction in the amplitude of the charging current the controller is configured to determine that the charging state of the rechargeable battery is the constant voltage charging state and set the current source to operate in a sleep mode to stop charging the rechargeable battery.

17. The charging device of claim 15, wherein the controller is configured to set the output voltage at the first amplitude, compare the amplitude of the charging current with a current threshold and allow the charging of the rechargeable battery when the amplitude of the charging current is above the current threshold.

18. The charging device of claim 17, wherein if the comparison indicates that the amplitude of the charging current is below the current threshold, the controller is configured to then set the output voltage at the second amplitude and if the controller measures no appreciable change in the amplitude of the charging current the controller is configured to determine that the charging state of the rechargeable battery is a preliminary charging state and continue charging the rechargeable battery.

19. The charging device of claim 15, wherein the first amplitude of the output voltage is set to be greater than a minimum charging device voltage and the second amplitude of the output voltage is set to be greater than a pre-charge voltage setting but less than the minimum charging device voltage.

20. A method for charging a rechargeable battery, wherein the method comprises:
indirectly determining a charging state of the rechargeable battery by either varying an amplitude of a charging current provided by a current source selected from a maximum of two current amplitudes, measuring an output voltage at an output node of the current source and comparing the measured voltage to a voltage threshold selected from a maximum of two voltage thresholds, or by varying an amplitude of the output voltage at the output node of the current source selected from a maximum of two voltage amplitudes, measuring the charging current provided by the current source and comparing the measured current to a single current threshold;
configuring the current source to provide the charging current with an amplitude that is less than the charging current required by the rechargeable battery in the determined charging state; and
providing the charging current from the current source to the rechargeable battery at the lesser amplitude to bring the output voltage of the current source towards a battery voltage of the rechargeable battery.

21. The method of claim 20, in which the charging state of the rechargeable battery is determined by varying the charging current, and wherein the method further comprises providing the charging current from the current source to a battery interface of the rechargeable battery, varying the amplitude of the charging current provided by the current source, the variation including first and second amplitudes, the second amplitude being smaller than the first amplitude, and subsequently measuring the output voltage at an output node of the current source to determine whether the charging state of the rechargeable battery is a constant voltage charging state.

22. The method of claim 21, wherein the method further comprises setting the current source to provide the charging current with the second amplitude, comparing the output voltage with the voltage threshold and determining that the charging state of the rechargeable battery is the constant voltage charging state when the output voltage is above the voltage threshold, and setting the current source to operate in a sleep mode to stop charging the rechargeable battery when the charging state is determined to be the constant voltage charging state.

23. The method of claim 21, wherein the method further comprises setting the current source to provide the charging current with the first amplitude, comparing the output voltage with the voltage threshold and allowing the charging of the rechargeable battery when the output voltage is below the voltage threshold.

24. The method of claim 23, wherein if the comparison indicates that the output voltage is above the voltage threshold, the method further comprises setting the current source to provide the charging current with the second amplitude and if the output voltage is then measured below the voltage threshold the method further comprises determining that the charging state of the rechargeable battery is a preliminary charging state and continuing to provide the charging current to charge the rechargeable battery.

25. The method of claim 22, wherein the method further comprises setting the first amplitude between current amplitudes associated with a pre-charge current setting and a fast-charge current setting and setting the second amplitude below the pre-charge current setting.

26. The method of claim 22, wherein the method further comprises setting the voltage threshold between a minimum charging device voltage and a charging device regulation voltage.

27. The method of claim 20, wherein the charging state of the rechargeable battery is determined by varying the charging current, the rechargeable battery does not have a battery interface and prior to charging the method comprises measuring the output voltage at an output node of the current source, allowing charging if the measured output voltage is lower than a first voltage threshold and not allowing charging if the measured output voltage is higher than the first voltage threshold.

28. The method of claim 27, wherein if charging is allowed the method comprises setting the current source to provide the charging current at a first amplitude if the measured output voltage is greater than a second voltage threshold and at a second amplitude if the measured output voltage is less than the second voltage threshold.

29. The method of claim 28, wherein the method further comprises subsequently measuring the output voltage and if the subsequently measured output voltage is greater than the first voltage threshold the method comprises disabling the current source if battery capacity is near full, and setting the current source to provide the charging current at the second amplitude, indicating the battery capacity is near full and performing an additional output voltage measurement if the battery capacity is not near full.

30. The method of claim 29, wherein if the subsequently measured output voltage is less than the first voltage threshold and less than the second voltage threshold the method further comprises setting the current source to provide the charging current at the second amplitude and performing the additional output voltage measurement.

31. The method of claim 29, wherein if the subsequently measured output voltage is less than the first voltage threshold and greater than the second voltage threshold, the method further comprises setting the current source to provide the charging current at the second amplitude and performing the additional output voltage measurement if the battery capacity is near full, and setting the current source to provide the charging current at the first amplitude and performing the additional output voltage measurement if the battery capacity is not near full.

32. The method of claim 28, wherein the method comprises setting the first voltage threshold to a regulation voltage setting, setting the second voltage threshold to a pre-charge voltage setting, setting the first amplitude between current amplitudes associated with a pre-charge current setting and a fast-charge current setting and setting the second amplitude below a max pre-charge current allowed with the rechargeable battery.

33. The method of claim 20, in which the charging state of the rechargeable battery is determined by varying the amplitude of the output voltage, and wherein the method further comprises providing the charging current from the current source to a battery interface of the rechargeable battery, varying the amplitude of the output voltage at an output node of the current source, the variation including first and second amplitudes, the second amplitude being smaller than the first amplitude, and subsequently measuring an amplitude of the charging current to determine whether the charging state of the rechargeable battery is a constant voltage charging state.

34. The method of claim 33, wherein the method further comprises setting the output voltage at the second amplitude, and if a substantial reduction in the amplitude of the charging current is measured the method comprises determining that the charging state of the rechargeable battery is the constant voltage charging state and setting the current source to operate in a sleep mode to stop charging the rechargeable battery.

35. The method of claim 33, wherein the method further comprises setting the output voltage at the first amplitude, comparing the amplitude of the charging current with a current threshold and allowing the charging of the rechargeable battery when the amplitude of the charging current is above the current threshold.

36. The method of claim 35, wherein if the comparison indicates that the amplitude of the charging current is below the current threshold, the method further comprises setting the output voltage at the second amplitude and if no appreciable change in the amplitude of the charging current is measured the method further comprises determining that the charging state of the rechargeable battery is a preliminary charging state and continuing to charge the rechargeable battery.

37. The method of claim 33, wherein the method comprises setting the first amplitude of the output voltage to be greater than a minimum charging device voltage and setting the second amplitude of the output voltage to be greater than a pre-charge voltage setting but less than the minimum charging device voltage.

38. A computer program product comprising a non-transitory computer readable storage medium embodying program code means executable by a processor of a charging device for executing a method of charging a rechargeable battery, wherein the method comprises:

indirectly determining a charging state of the rechargeable battery by either varying an amplitude of a charging current provided by a current source selected from a maximum of two current amplitudes, measuring an output voltage at an output node of the current source and comparing the measured voltage to a voltage threshold selected from a maximum of two voltage thresholds, or by varying an amplitude of the output voltage at the output node of the current source selected from a maximum of two voltage amplitudes, measuring the charging current provided by the current source and comparing the measured current to a single current threshold;

configuring the current source to provide the charging current with an amplitude that is less than the charging current required by the rechargeable battery in the determined charging state; and providing the charging current from the current source to the rechargeable battery at the lesser amplitude to bring the output voltage of the current source towards a battery voltage of the rechargeable battery.

* * * * *